US012258800B2

(12) United States Patent
McGee

(10) Patent No.: US 12,258,800 B2
(45) Date of Patent: Mar. 25, 2025

(54) LAMINATE PANEL AND OVERHEAD SECTIONAL DOOR PANEL WITH LAMINATE PANELS AND A UNIVERSAL FABRIC HINGE

(71) Applicant: Clopay Corporation, Mason, OH (US)

(72) Inventor: John K. McGee, Mason, OH (US)

(73) Assignee: Clopay Corporation, Mason, OH (US)

( * ) Notice: Subject to any disclaimer, the term of this patent is extended or adjusted under 35 U.S.C. 154(b) by 539 days.

(21) Appl. No.: 17/246,532

(22) Filed: Apr. 30, 2021

(65) Prior Publication Data

US 2021/0340799 A1 Nov. 4, 2021

Related U.S. Application Data

(60) Provisional application No. 63/019,077, filed on May 1, 2020.

(51) Int. Cl.

| | |
|---|---|
| ***E05D 15/16*** | (2006.01) |
| ***E05D 15/24*** | (2006.01) |
| ***E06B 3/48*** | (2006.01) |
| ***E06B 3/70*** | (2006.01) |

(52) U.S. Cl.

CPC ......... *E05D 15/165* (2013.01); *E05D 15/242* (2013.01); *E06B 3/486* (2013.01); *E06B 3/7001* (2013.01); *E05Y 2900/106* (2013.01); *E06B 2003/7044* (2013.01)

(58) Field of Classification Search

CPC .. E06B 3/485; E06B 3/486; E06B 2009/1533; E06B 2009/155; E06B 2009/1555; E06B 2009/1561; E06B 2009/1566; E05D 15/242; E05D 15/24

See application file for complete search history.

(56) References Cited

U.S. PATENT DOCUMENTS

| | | | | |
|---|---|---|---|---|
| 3,648,755 A | | 3/1972 | Thiele | |
| 5,129,441 A | | 7/1992 | Leist et al. | |
| 5,481,076 A | | 1/1996 | Mullet et al. | |
| 5,549,149 A | * | 8/1996 | Sills | A47K 3/006 160/230 |
| 5,738,161 A | * | 4/1998 | Martin | E05F 15/684 160/230 |
| 5,915,445 A | * | 6/1999 | Rauenbusch | B32B 5/18 160/230 |
| 6,149,998 A | * | 11/2000 | Hettinga | E05D 1/02 428/44 |

(Continued)

FOREIGN PATENT DOCUMENTS

| | | |
|---|---|---|
| DE | 7331995 U | 2/1974 |
| WO | WO 2019/051049 A1 | 3/2019 |

OTHER PUBLICATIONS

Hi-Nicalon Fiber-Reinforced Celsian Matrix Composites: Influence of Interface Modification (Year: 1998).*

(Continued)

*Primary Examiner* — Abe Massad
*Assistant Examiner* — John W Hanes, Jr.

(57) ABSTRACT

In example a panel for an overhead sectional door is provided. The panel includes a laminate core, a laminate skin, and a universal fabric hinge. The laminate skin is coupled to two opposing sides of the laminate core. The universal fabric hinge is coupled to the laminate skin to connect the panel to an adjacent panel of the overhead sectional door.

15 Claims, 13 Drawing Sheets

(56) References Cited

U.S. PATENT DOCUMENTS

| | | | | |
|---|---|---|---|---|
| 6,484,447 | B1 * | 11/2002 | Snyder | E06B 3/485<br>160/40 |
| 6,942,000 | B2 | 9/2005 | Hoerner et al. | |
| 7,690,158 | B2 * | 4/2010 | Kelly | E04B 2/7429<br>52/794.1 |
| 10,252,505 | B2 * | 4/2019 | Pilpel | B29C 65/02 |
| 2004/0079494 | A1 * | 4/2004 | Snyder | E06B 3/7005<br>160/232 |
| 2009/0025334 | A1 | 1/2009 | Aquilina et al. | |
| 2019/0106919 | A1 * | 4/2019 | Kelley | E05D 15/242 |

OTHER PUBLICATIONS

Note on Flexural Fatigue of Textiles—RP1485—National Bureau of Standards—Schiefer and Boyland (Year: 1942).*

International Search Report and The Written Opinion mailed in corresponding PCT/US21/30346 on Aug. 13, 2021, 11 pages.

Supplementary Partial European Search Report for Application No. EP 21 79 7225, dated Apr. 25, 2024, 15 pages.

* cited by examiner

LAMINATE PANEL AND OVERHEAD SECTIONAL DOOR PANEL WITH LAMINATE PANELS AND A UNIVERSAL FABRIC HINGE

CROSS REFERENCE TO RELATED APPLICATIONS

This application claims priority to U.S. Provisional Patent Application Ser. No. 63/019,077, filed May 1, 2020, which is herein incorporated by reference in its entirety.

BACKGROUND

Overhead sectional doors can be used to control access into buildings. Typically, such an overhead sectional door has a number of rectangular door panels or panel sections, the total area of which is similar or equal to the area of the aperture that needs to be closed, and the width of which is close to the width of the wall opening that needs to be closed. The panel sections are joined to each other at their longitudinal edges with hinges. The overhead sectional door moves on two lateral tracks by means of rollers. The tracks have three sections: vertical, transitional, and horizontal sections. When the overhead sectional door is vertical in a closed position, the wall opening is covered by the overhead sectional door. When the overhead sectional door is opening, the panels move up, pass the track transitional section, and move into the track horizontal section of the track to rest in a horizontal position or "open" position. When the overhead sectional door is in the horizontal position, the door is situated superjacent to the wall opening.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to overhead sectional doors of the type used to close large openings in garages and commercial buildings. As discussed above, an overhead sectional door has a number of rectangular door panels or panel sections, the total area of which is similar or equal to the area of the aperture that needs to be closed, and the width of which is close to the width of the wall opening that needs to be closed. The panel sections are joined to each other at their longitudinal edges with hinges. The overhead sectional door moves on two lateral tracks by means of rollers. The tracks have three sections: vertical, transitional, and horizontal sections. When the overhead sectional door is vertical in a closed position, the wall opening is covered by the overhead sectional door. When the overhead sectional door is opening, the panels move up, pass the track transitional section, and move into the track horizontal section of the track to rest in a horizontal position or "open" position. When the overhead sectional door is in the horizontal position, the door is situated superjacent to the wall opening.

Damage to industrial overhead sectional doors frequently occurs due to impacts by material handling equipment such as forklifts. Damage to a door may be avoided by providing the door with some type of door panel that can adsorb or deflect upon impact without denting, cracking, or otherwise breaking for relatively minor impacts when the door is in a closed position. Sections located on the lower portion of the overhead sectional door are often subject to such impacts. It is also desired to utilize a hinge and seals that can similarly withstand an impact without creating a weak point in the overhead sectional door that will not leak, warp, or break.

While providing the ability to flex and absorb impacts, the overhead sectional door must still provide a barrier that prevents intrusion of water and air between the sections of the overhead door. As such, it is further desired to provide a seal structure between an overhead sectional door comprising at least one laminate panel.

The present disclosure provides an overhead sectional door that uses laminate panels that can absorb impact without denting, cracking, or otherwise breaking from minor impacts. The overhead sectional doors include components that allow the laminate panels to be connected to each other or to panels fabricated from other materials (e.g., steel). The present disclosure provides hinges that can withstand minor impacts while securing adjacent panels. Lastly, the design of the components that connect the laminate panels also provide a seal structure that prevents intrusion of water and air between the sections of the overhead door.

Figure 1:
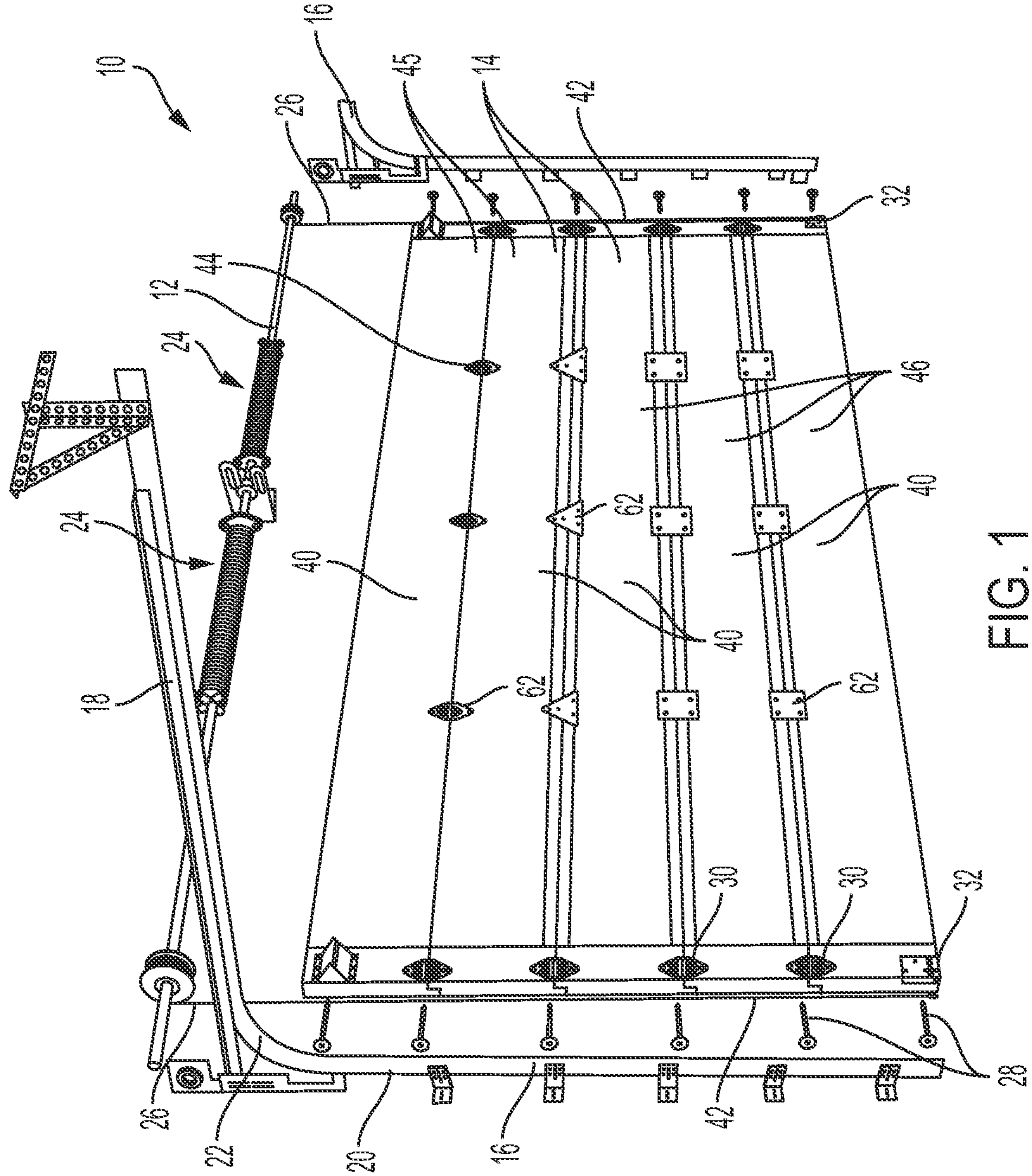
FIG. 1 is an example overhead sectional door of the present disclosure viewed from the inside of a building showing an exploded view of the roller and track system.

FIG. 1 illustrates an example overhead sectional door (10) of the present disclosure. The example overhead sectional door (10) may be utilized in a residential, commercial, institutional, or other structure to selectively cover an opening in a wall of the structure.

As shown in FIG. 1, the overhead sectional door (10) includes a number of elongate and generally horizontally oriented door panels (14) (also referred to herein as panels (14)). The overhead sectional door (10) and the panels (14) are movable selectively to and between a closed position in which the door covers the opening in the wall (12) and an open position which exposes the opening in the wall (12) and positions the panels (14) in a head area superjacent to the opening in the wall (12).

As can be further seen in FIG. 1, the panels (14) are each mounted within a track system (16) on the left and right side of the opening in the wall (12), the track system (16) having track horizontal sections (18), track vertical sections (20) and track transition sections (22) mounted on each side of the opening in the wall (12) at the lateral ends (42) of the panels (14) as shown. The panels (14) are raised and lowered to open and close the opening for traffic to pass through, as required. The weight of the panels (14) is counterbalanced by a set of extension springs or a counterbalance system (24), which is in turn indirectly fastened to a cable (26), which is directly fastened to either the upper panel or a bottom bracket (32) on a lower panel. The overhead sectional door (10) may be between 6 feet to 15 feet in width and 3 feet to 12 feet in height.

In an embodiment, the overhead sectional door (10) may have all rectangular panels, such as panels (14) and laminate panels (46) going across the opening in the wall (12) from side to side. The panels (14) may be coupled to one another via center hinges (62). As discussed in further details below, different types of center hinges (62) may be deployed for connections between different combinations of panels (14) made from different materials.

Figure 2:
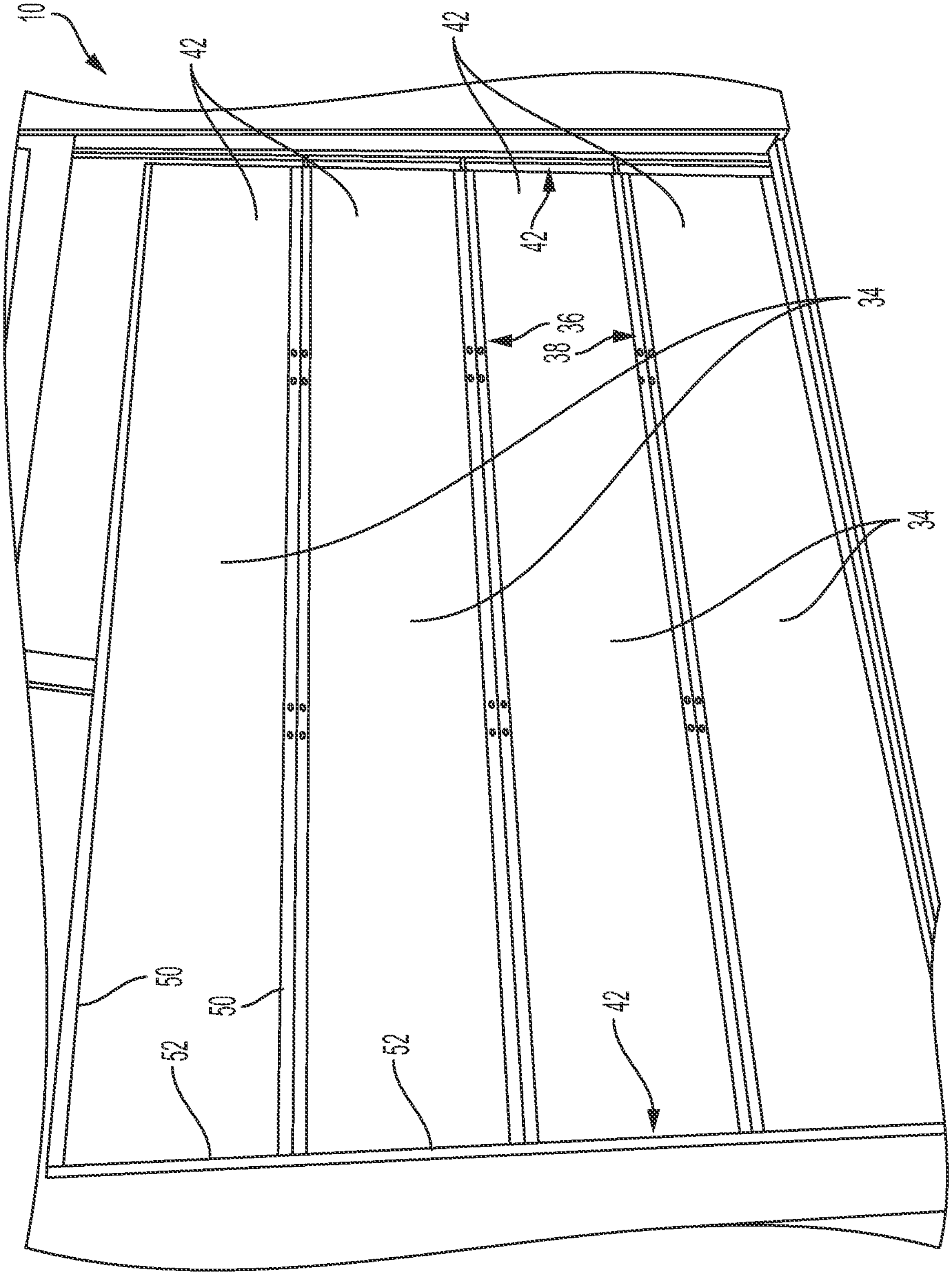
FIG. 2 is an example overhead sectional door of the present disclosure viewed from the outer face of the overhead sectional door panels.

Referring to FIG. 2, the panel (14) includes an outer face (34), an upper edge (36), a lower edge (38), two lateral ends (42). The panel (14) may also include an inner face (40), as shown in FIG. 1. Panels may be non-laminate panels (45) or laminate panels (46). For example, FIG. 1, illustrates an example that includes two non-laminate panels (45) and three laminate panels (46) of the present disclosure.

A non-laminate panel (45) may be constructed of metal, such as aluminum, vinyl, or other material and may include internal insulation. The upper edge (36) of a non-laminate panel (45) may include a tongue (not shown), which is compatible with a groove on the lower edge (38) of the adjacent non-laminate door panel (45). The tongue and groove are designed to mate together for adjacent panels (45) in the overhead sectional door (10). It will be appreciated that other shapes, designs, and embodiments of the non-laminate panel (45) may be utilized. The non-laminate panel (45) body may be pivotally connected to other non-laminate panels (45) by suitable metal hinges (44), as illustrated in FIG. 1.

In the present application, the overhead sectional door (10) comprises two or more door panels (14), wherein at least one door panel (14) comprises a laminate panel (46). The laminate panel (46) may provide the ability to flex and absorb impacts, as described above, while still providing a seal structure to prevent intrusion of water and air between the sections of the overhead sectional door (10).

Figure 3:
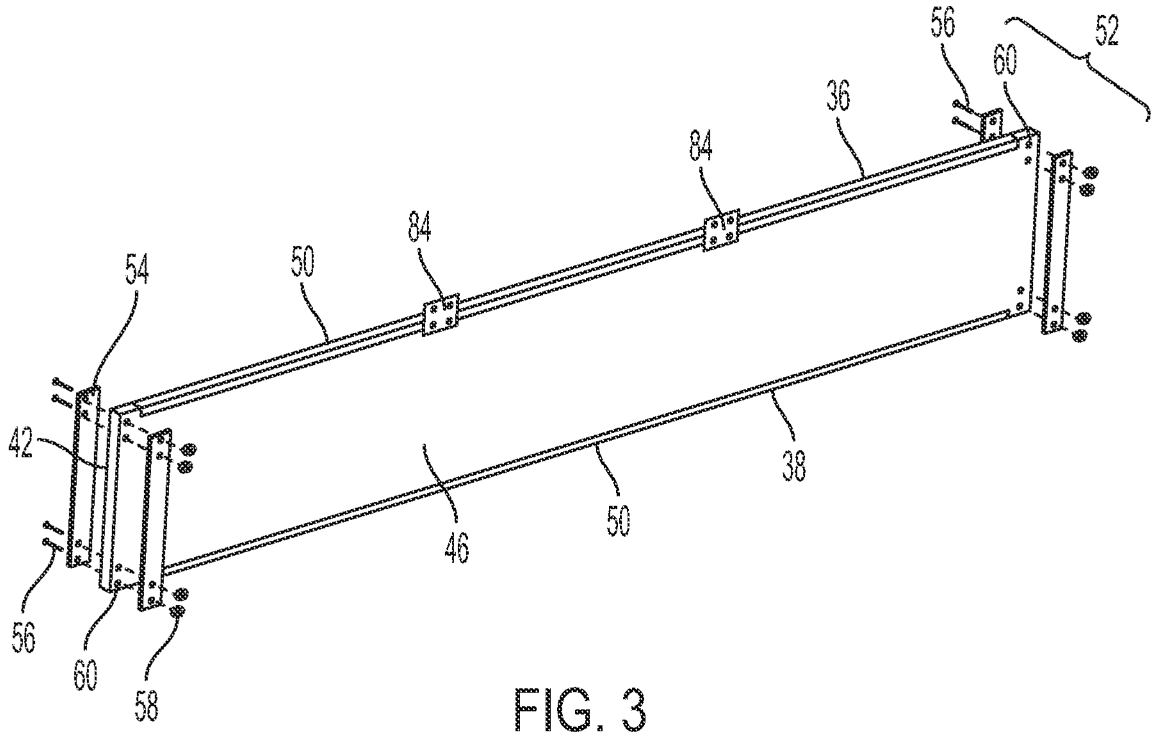
FIG. 3 is a partial exploded view of an example laminate panel of the present disclosure with end stiles, seal structures, and laminate-to-laminate center hinges.
Figure 4:
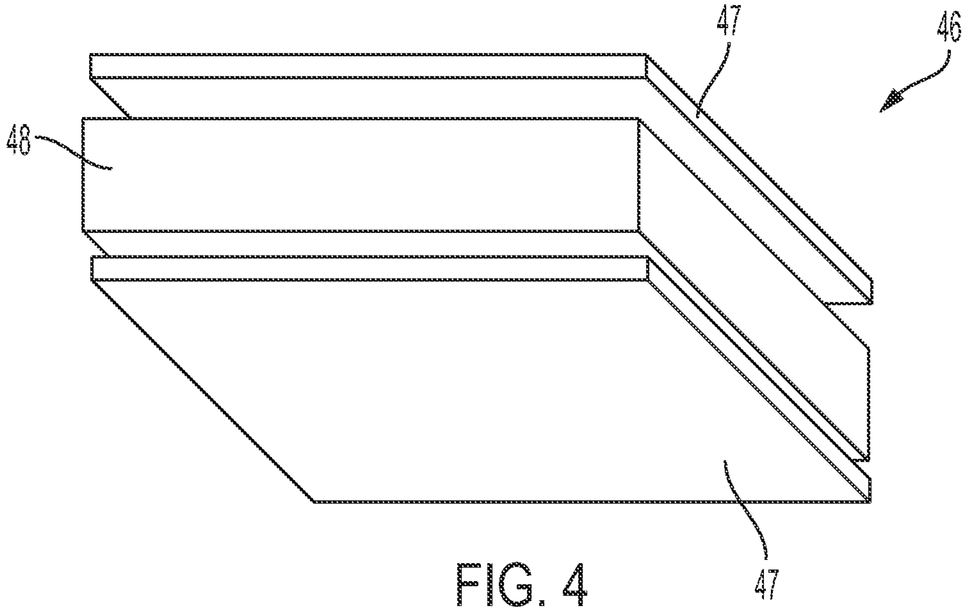
FIG. 4 is a magnified, partial, exploded view of an example of a laminate structure of the overhead sectional door.

FIGS. 3 and 4 illustrate an example of the laminate panel (46). As shown in an example exploded view of the laminate panel (46) in FIG. 4, the laminate panel (46) may include a laminate skin (47) and a laminate core (48). The laminate skin (47) may be located on both sides of the laminate core (48).

FIG. 3 illustrates additional components that make the laminate panel (46) suitable for use in an overhead sectional door (10). For example, the laminate panel (46) may include an upper and lower seal structure (50), an end stile (52), and compatible hinges (e.g., laminate-to-laminate center hinges (84)). The end stile (52) may include two opposing plates that are coupled to opposite sides of lateral ends (42). The two opposing plates may be a pair of 20 gauge steel plates. The two opposing plates include through-holes (54). The through-holes (54) may be aligned with laminate panel through holes (60). The opposing plates of the end stile (52) may be coupled together via a bolt (56) (e.g., a carriage bolt) and nut (58) combination fed through the through-holes (54) and the laminate panel through holes (60). In one embodiment, the end stile (52) may be made from steel, plastic, or fabric. In one embodiment, the end stile (52) may be made from 20 gauge hot galvanized cold-rolled steel.

Figure 16:
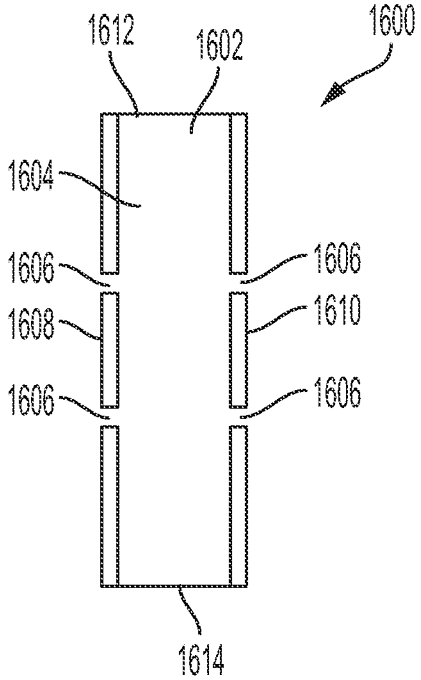
FIG. 16 is a front view of an example single piece end stile of the present disclosure.
Figure 17:
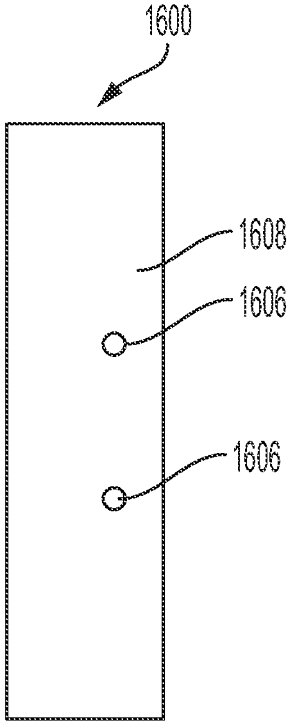
FIG. 17 is a side view from the outside of the example single piece end stile of the present disclosure.
Figure 18:
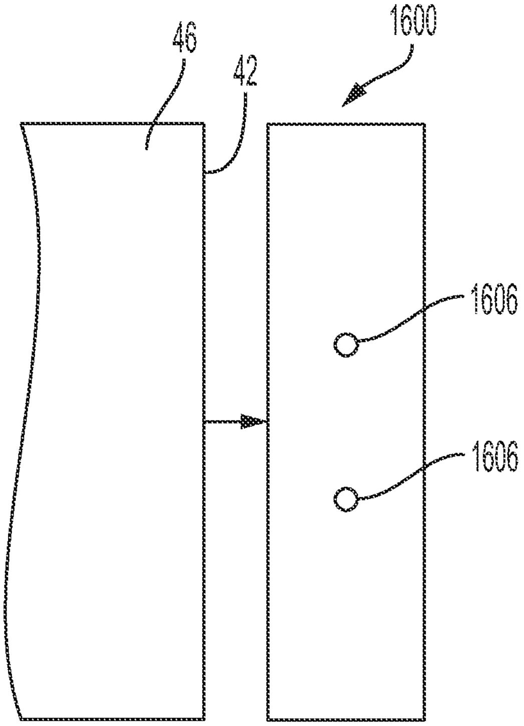
FIG. 18 is a side view to illustrate how the laminate panel is inserted into the example single piece end stile of the present disclosure.

FIGS. 16-18 illustrate different views of an example single piece end stile (1600) of the present disclosure. The single piece end stile (1600) may be formed as a three-dimensional end cap structure that fits at the lateral end (42) of a laminate panel (46). The single piece end stile (1600) may be fabricated from steel, metal, plastic, or fabric. In one embodiment, the single piece end stile (1600) may be made from 12-16 gauge hot galvanized cold-rolled steel.

FIG. 16 illustrates a front view of the single piece end stile (1600). The single piece end stile (1600) may include a first side (1608), a second side (1610), and a third side (1602). The third side (1602) may be coupled perpendicularly to the first side (1608) and the second side (1610). A top side (1612) and a bottom side (1614) may be coupled to opposing ends of the first side (1608), the second side (1610), and the third side (1602). The combination of the first side (1608), the second side (1610), the third side (1602), the top side (1612), and the bottom side (1614) may form a volume (1604). The volume (1604) may be sized to fit a lateral end (42) of a laminate panel (46).

The single piece end stile (1600) may include through holes (1606). The through holes (1606) may be aligned with the laminate panel through holes (60) and secured by the bolt (56) and nut (58) combination illustrated in FIG. 3. FIG. 17 illustrates a side view of the single piece end stile (1600) that illustrates the through holes (1606).

FIG. 18 illustrates an example side view of the single piece end stile (1600) and how the lateral end (42) of the laminate panel (46) may be inserted into the volume (1604) of the single piece end stile (1600). The single piece end stile (1600) may include additional features that are not shown. For example, one of the sides (e.g., the first side (1608) that may be on the inner face 40 of the laminate panel (46)) may include pre-drilled pilot holes for screws. The single piece end stile (1600) may be painted to match a color of the overhead sectional door (10).

Although examples of the end stile (52) and the single piece end stile (1600) are illustrated as being coupled via a bolt (56) and nut (58), it should be noted that the end stile (52) and the single piece end stile (1600) may be attached via other means. For example, the attachment may be via an adhesive, other types of hardware (e.g., nails, screws, and the like), or any other type of attachment means.

Referring back to FIG. 4, the outer face (34) and inner face (40) of the laminate panel (46) comprise the laminate core (48). The laminate core (48) may be located between the outer face (34) laminate skin (47) and the inner face (40) laminate skin (47) of the laminate panel (46).

Figure 5:
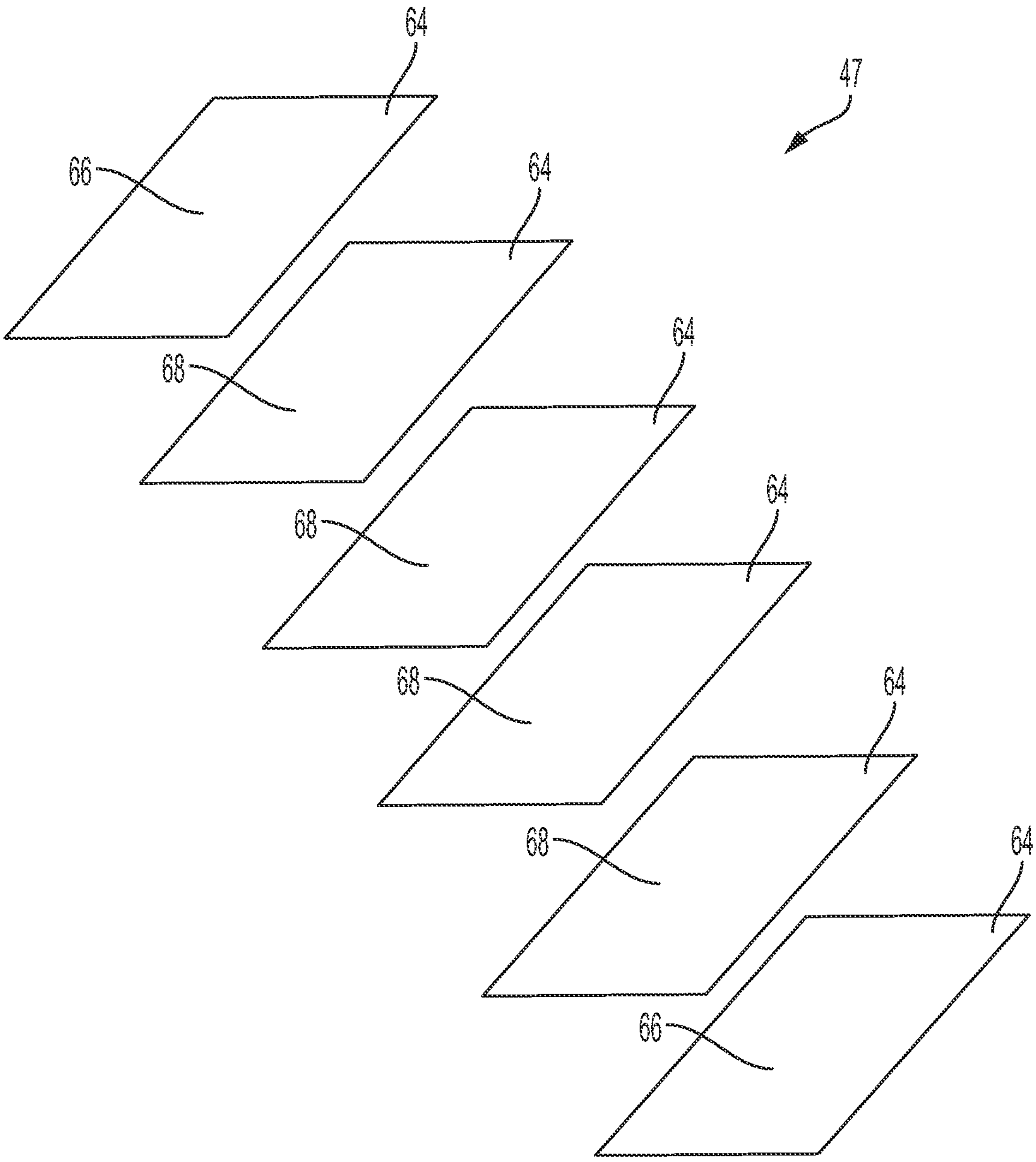
FIG. 5 is one embodiment of a magnified, partial, exploded view of an example of a six ply laminate skin structure of the overhead sectional door.
Figure 6:
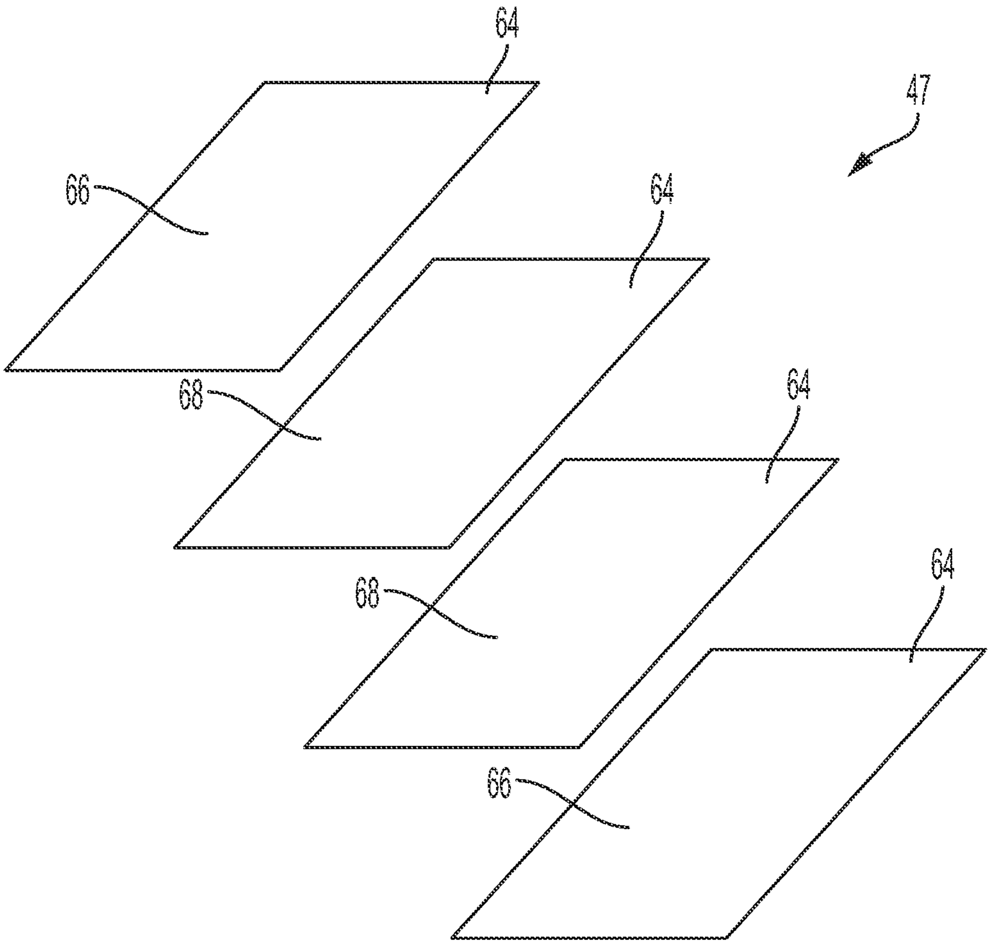
FIG. 6 is a second embodiment of a magnified, partial, exploded view of an example of a four ply laminate skin structure of the overhead sectional door.

FIGS. 5 and 6 illustrate examples of laminate skins (47) including a plurality of composite plies (64). In one embodiment, the laminate skin (47) may comprise a polymer composite formed of at least two composite plies (64). In one embodiment, the laminate skin (47) may comprise more than 4 plies (64). In one embodiment, the laminate skin (47) may comprise between 4 and 6 plies (64).

In one embodiment, each ply (64) may comprise a plurality of fibers that are longitudinally oriented (that is, they are aligned with each other), and may be continuous across the ply (64). The plurality of fibers is impregnated with a thermoplastic matrix material to form a wetted, very low void composite ply, optionally to the substantial exclusion of thermosetting matrix material. In one embodiment, the fibers may be encapsulated in the thermoplastic matrix material. A composite ply is sometimes referred to herein as a ply or sheet and may be characterized as "unidirectional" in reference to the longitudinal orientation of the fibers. A number of companies make pultruded reinforced polymer composites, including PolyOne Corporation via its Advanced Composites Group, particularly its Avient business selling thermoplastic fiber-reinforced composites.

Various types of fibers may be used in a composite ply. Example fibers include E-glass and S-glass fibers. E-glass is a low alkali borosilicate glass with good electrical and mechanical properties and good chemical resistance. This type of glass is the most widely used in fibers for reinforcing plastics. S-glass is the higher strength and higher cost material relative to E-glass. S-glass is a magnesia-alumina-silicate glass with high tensile strength. E-glass fiber may be incorporated in the composite in a wide range of fiber weights and thermoplastic polymer matrix material. The E-glass may range from about 10 to about 40 ounces per square yard (oz./sq.yd.), 19 to 30 oz./sq.yd., or 21.4 to 28.4 oz./sq.yd. of reinforcement. Individual glass fiber diameters can range from about 10 mih (also called microns) to about 25 mih or from about 14 mih to about 18 mih. The diameters of glass fiber in the various layers of sheet can be the same or different depending on choice of the polymer engineer.

The quantity of S-glass or E-glass fiber in a composite ply may optionally accommodate about 40 to about 90 weight percent (wt %) thermoplastic matrix, about 50 to about 85 wt %, or about 60 to about 80 wt % thermoplastic matrix in the ply, based on the combined weight of thermoplastic matrix plus fiber. Other fibers may also be incorporated, preferably in combination with E-glass and/or S-glass, but optionally instead of E- and/or S-glass. Such other fibers include ECR, A and C glass, as well as other glass fibers; fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

The composite plies (64) may optionally include fibers that are continuous, chopped, random comingled, and/or woven. In particular embodiments, composite plies (64), as described herein, may contain longitudinally oriented fibers to the substantial exclusion of non-longitudinally oriented fibers.

The thermoplastic matrix material may comprise a polymer that may be a high molecular weight thermoplastic polymer, including but not limited to, polypropylene, polyethylene, nylon, polyetherimide (PEI) and copolymers, polyamide, polyether ether ketone (PEEK), polyether ketone (PEK), polyphenylene sulfide (PPS); more preferably, polypropylene and polyethylene. Thermoplastic loading by weight can vary widely depending on the physical property requirements of the finished part and the nature of the molding method being utilized. Various methods are known in the art by which the fibers in a ply may be impregnated with and optionally encapsulated by the thermoplastic matrix material, including, for example, a doctor blade process, lamination, pultrusion, extrusion, etc.

A composite ply may contain about 60 to about 10 wt % thermoplastic matrix, about 50 to about 15 wt %, or, about 40 to about 20 wt % of thermoplastic matrix material, by weight of thermoplastic matrix material plus fibers. The continuous reinforcing fibers can comprise from about 30 volume percent to about 75 volume percent or from about 35 volume percent to about 55 volume percent of each layer of the sheet, with the remaining volume percentage being the thermoplastic resin matrix including minor amounts, if any, of optional functional additives. The volume percent content of continuous reinforcing fiber in the various layers of the sheet can be the same or different depending on the choice of the polymer engineer.

The various layers can have a unidirectional orientation or alignment of fibers in the thermoplastic matrix relative to the direction of the extrusion process (generally referred to as the machine direction in film manufacturing). Zero degrees (0°) means that the orientation of the fibers is the same as the "machine" direction. Ninety degrees (90°) means that the orientation of the fibers is orthogonal or transverse to the "machine" direction of the ply (64). The method of forming composite plies (64) with alternating layers of transversely-oriented fibers includes (a) positioning a first sheet having longitudinal continuous reinforcing fibers oriented in a first direction embedded in a thermoplastic matrix such as a zero degree ply; (b) coextensively positioning a second sheet having longitudinal continuous reinforcing fibers oriented substantially perpendicular to the fibers of the first sheet, such as a ninety degree ply; and (c) repeating the layup of alternating or non-alternating fiber directional sheets to form a multi-sheet composite prepreg, a common acronym for pre-impregnated item of manufacture.

A suitable prepreg or laminate skin (47), as described herein, comprises at least a first ply and a second ply that are bonded together with their respective fibers in transverse relation to each other. The lamination of multiple layers relative to their respective orientations is a significant determining factor to the strength, flexibility, and other physical properties of the reinforced thermoplastic composite laminate.

Certain embodiments utilize a multiple-ply configuration wherein a first ply is deemed zero degrees, a second ply is disposed at a first angle (for example, a positive acute angle) relative to the first sheet (for example, about 90 degrees), and a third ply is disposed at a second angle which may be the same or different from the first angle (for example, about 90 degrees or 45 degrees) relative to the first ply, so on and so forth to the number of desired plies in the laminate skin (47). Thus, the second and third plies may or may not have fibers oriented perpendicular to each other.

FIG. 5 illustrates an example of a laminate skin (47). In one embodiment, the laminate skin (47) may include a first composite ply (64) which is a zero degree ply (66). The second through fourth composite plies (64) may be 90 degree plies (68). The last composite ply (64) on top of the stack may be a zero degree ply (66).

FIG. 6 illustrates another example of a laminate skin (47). In one embodiment, the laminate skin (47) may include a first composite ply (64) which is a zero degree ply (66). The second and third composite plies (64) may be 90 degree plies (68). The last composite ply (64) on top of the stack may be a zero degree ply (66).

It should be noted that FIGS. 5 and 6 illustrate some examples, and that other examples of orientations or sequences of the zero degree ply (66) and the 90 degree ply (68) may be possible. For example, the laminate skin (47) may have at least a first ply and a second ply in an adjacent relationship, wherein the fiber directions differ by any degree between 45° and 90° or between −45° and −90°, and wherein the difference between the fiber angles, equals or is greater than 5° C. In one embodiment, the difference can be greater than 10° C., or 15° C., or greater than 25° C., or greater than 50° C. There can be more than two composite plies (64) to the laminate skin (47), such as 3, 4, 5, or 6 plies.

In one embodiment, the composite ply (64) can contain a resin which is the same as other plies or different from other plies, and wherein the composite ply (64) comprises a fiber orientation the same as or different from other plies. For instance, the laminate skin (47) may be selected to comprise 4 or more composite plies (64), with each composite ply (64) comprising fibers oriented in the same or different orientations from other composite plies (64). The types of resin or fiber material may be the same or different for each composite ply (64). The concept of this type of multi-ply laminate skin (47) can continue in various numbers and combinations of plies.

In one embodiment, the first composite ply (64) may contain fibers that are different from the fibers in the second composite ply (64). Thus, the laminate skin (47) may comprise at least two different kinds of fibers. Additionally, fibers in at least a first composite ply (64) may be disposed in transverse relation to different fibers in an adjacent second composite ply (64), optionally at 90 degrees to the different fibers in the adjacent second composite ply (64).

The matrix material of the individual composite plies (64) can be a thermoplastic polymer or a thermosetting polymer. In addition, the matrix material can vary from ply-to-ply and can be in the form of different thermoplastics, different thermosetting polymers, or combinations of thermoplastic and thermosetting polymers. Therefore, a portion of a laminate skin (47) incorporating a first fiber type can be formed in part by stacking individual composite plies one-on-the-next in parallel relation to each other. Any two thermoplastic resins with a differential HDT (tested without fiber reinforcement at 1.8 Mpa per ASTM D648) of 5° C. or greater are candidates for use in this disclosure. Non-limiting examples of the thermoplastic resin are polyesters such as polyethylene terephthalate (PET), glycol-modified polyethylene terephthalate (PETG), polybutylene terephthalate (PBT), and amorphous copolyesters; bisphenol-A based polycarbonate homopolymers and copolymers; polyolefins such as polyethylenes and polypropylenes, and cyclic olefin copolymers; polyamides; polyphenylene sulfides; polyetherimides and combinations thereof.

Non-limiting examples of the number of composite plies (64) can range from 2 to 6 layers, with orientations of any combination of 0° and 90° and any angles between them. In one embodiment, a four-layer laminate skin, 5-layer laminate skin, or 6-layer laminate skin may be utilized. Such composite plies (64) are oriented in a 0°/90 or 90/0° combinations. Accordingly, the two types of composite plies (64) may have fibers running 90 degrees offset from each other. In one embodiment, the two composite plies (64) located on the outside of the laminate skin (47) have unidirectional fiber reinforcement transverse to the two or more composite plies (64) located between the outer composite plies (64) of the laminate skin (47) (e.g., as illustrated in FIGS. 5 and 6).

In one embodiment, a composite laminate comprises composite plies (64) that contain E- and S-glass fibers, respectively, and that are oriented at angles of about 90° relative to one another in ply configuration.

Various methods can be employed to bond the composite plies (64) together to form the laminate skin (47), including stacking the composite plies (64) one on the next and applying heat and/or pressure or using adhesives in the form of liquids, hot melts, reactive hot melts or films, epoxies, methylacrylates, and urethanes. Sonic vibration welding and solvent bonding can also be employed. The surfaces of the adjacent composite plies (64) fuse together such that the composite plies (64) become a single unitary sheet of material for forming the laminate skin (47).

The thermoplastic matrices of the laminate skin (47) formed by the composite plies (64) can include conventional plastic additives in an amount that is sufficient to obtain a desired processing or performance property for the compound. The amount should not be wasteful of the additive nor detrimental to the processing or performance. Those skilled in the art of thermoplastics compounding, without undue experimentation but with reference to such treatises as Plastics Additives Database (2004) from Plastics Design Library (elsevier.com), can select from many different types of additives for inclusion into the matrices of the laminate skin (47). Non-limiting examples of optional additives include adhesion promoters; biocides (antibacterial, fungicide, and mildewcide), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light (UV) absorbers; viscosity regulators; waxes; and combinations of them. UV light from the sun tends to degrade plastics, such as a thermoplastic. In order to further increase the durability of the outer face (34) of the laminate panel (46), the laminate skin (47) may further comprise a ultraviolet light inhibitors or absorbers or stabilizers.

Referring back to FIG. 4, suitable core materials for use in the laminate panel (46) include laminate core (48) materials such a such as polymeric films or sheets, foamed sheets, honeycomb structured sheets, thermoset composite sheets, organic coatings, wood, and metal. Foamed sheets may comprise suitable polyphenylene ether-polystyrene foam blend, polystyrene, or polyurethane foam suitable for use as the laminate core (48). The laminate core (48) material may be a single structure or material or a laminate structure comprising the same or different materials. Materials may be different due to material selection, density, the addition of additives, or the addition of additional structures in the core material.

The laminate core (48) material may comprise additional structures that aid in the flexibility and impact resistance. For example, a foam laminate core material may comprise microspheres or lattice material.

The laminate core (48) makes up the majority of the laminate panel (46) thickness. Suitable laminate core (48) thicknesses may be appropriately selected for the intended use, but for laminate panels (46) suitable for use herein, the laminate panel (46) thickness may be between 0.5 and 4 inches, such as 1 inch, 2 inches, and 3 inches or between 1.0 and 3.0 inches. The majority of the laminate panel (46) thickness comprises the laminate core (48) thickness, such as more than 0.5 inches, such as 0.75 inches to 3.75 inches.

The laminate core (48) may be formed between laminate skins (47) by utilizing a "vertical" batch process where the laminate skin (47) is inserted into a jig, spaced apart on three sides by edging members, the fourth side presenting an opening at the top of the mold; the laminate skin (47) being adhered or taped to the sides of the jig to form a "mold." A foam mix may be introduced into the mold by any of a number of well-known filling techniques, for example, by direct pour or by using a reciprocating injection head. Alternatively, the laminate skin (47) may be cut to the desired laminate panel (46) size and placed in physical contact with a laminate core (48) material. Alternatively, individual composite plies (64) may be cut to the desired laminate panel (46) size and placed in physical contact with the laminate core (48) or another composite ply (64) according to a desired orientation of fibers within each composite ply (64), such as a zero degree ply in physical contact with a ninety degree ply.

Referring back to FIG. 3, gaps may be present between the door panels (14) of the overhead sectional door (10) when assembled. The gaps between the door panels (14) may be decreased or eliminated through the use of seals. While not required, a seal structure (50) may be located on the upper edge (36), on the lower edge (38), or on both the upper edge (36) and the lower edge (38) of a laminate panel (46), such that the seal structure (50) is oriented between the laminate panels (46) or non-laminate panel (45) of the overhead sectional door.

Suitable seal structures (50) include polyvinylchloride, chlorinated polyvinylchloride, and similar material, that may be attached to the laminate panel (46) at the upper edge (36) or lower edge (38) by adhesive, attachment hardware (nails, screws, bolts and nuts) and the like. The seal structure (50) allows for the laminate panel (46) to function without leaking air or liquids and allows for the laminate panel (46) to bend, flex, or move when the laminate panel (46) is impacted.

In one embodiment, the cross-section of the sealing structure (50) should comprise a convex surface relative to the upper edge (36) or lower edge (38) of the laminate panel (46). The convex surface allows for laminate panels (46) to bend, flex, or move when the laminate panel (46) is impacted, but is still able to provide a seal to prevent leaking of air or liquids through the interface between a first seal structure and a second seal structure. In one embodiment, the seal structures (50) may be three-dimensional structures.

Figure 7:
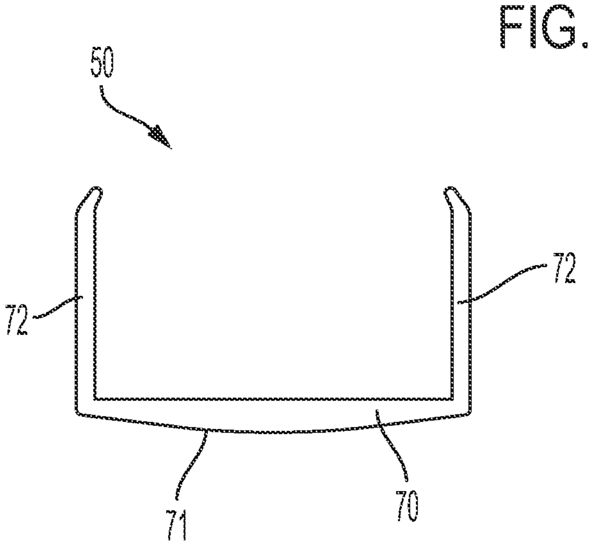
FIG. 7 is a cross-sectional end view of an example seal structure.
Figure 8:
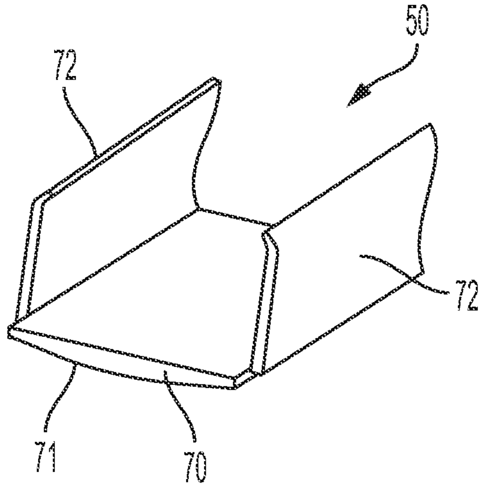
FIG. 8 is a cross-sectional partial perspective view of an example seal structure.

FIGS. 7 and 8 illustrate an example of the seal structure (50) of the present disclosure. FIG. 7 illustrates a front cross-sectional view of the seal structure (50), and FIG. 8 illustrates a top isometric view of the seal structure (50). As shown in FIGS. 7 and 8, the seal structure (50) may form a generally "U" shape that corresponds to the thickness of the panel (14) such that a base (70) of the "U" shape is adjacent to the upper edge (36) or the lower edge (38) of the laminate panel (46) or the non-laminate panel (45). The seal structure (50) is oriented such that an upper section (72) of the "U" shape is adjacent to the outer face (34) and the inner face (40) of the laminate panel (46). The seal structure (50) may run the entire length of the laminate panel (46) width. As shown in FIG. 3, the seal structure (50) may be notched out at the ends of the seal structure (50) to accommodate the attachment of end stiles (52), the single piece end stile (1600), and/or roller hinges (30) illustrated in FIG. 1.

Referring back to FIG. 1, hinges may be present at two or more locations along the width of upper edge (36) and lower edge (38) of adjacent door panels (14) of the overhead sectional door (10). The hinges may comprise metal components, fabric components, plastic components, and combinations thereof. The hinges may be attached to the door panel by adhesive, attachment hardware (nails, screws, bolts and nuts) and the like.

In one embodiment, a hinge located adjacent to the lateral end (42) of the door panel (14) may be used in combination with rollers (28) and may be referred to as a roller hinge (32). Door hinges located in the central portion of a door panel (14) may be referred to as center hinges (62). Center hinges (62) located between two non-laminate panels (45) may be metal hinges (44).

Center hinges (62) that are located between a laminate panel (46) and a non-laminate panel (45), or between two laminate panels (46), may utilize a fabric hinge. The fabric hinge may be mechanically attached to the lower edge (36) of the laminate panel (46) located higher in the overhead sectional door (10) structure and to the upper edge (36) of the laminate panel (46) located lower in the overhead sectional door (10) structure. In one embodiment, a laminate panel (46) may be oriented to be lower in the overhead sectional door (10) structure than any non-laminate panel (45) (i.e., lower on the overhead sectional door (10) and closer to the floor).

Figure 9:
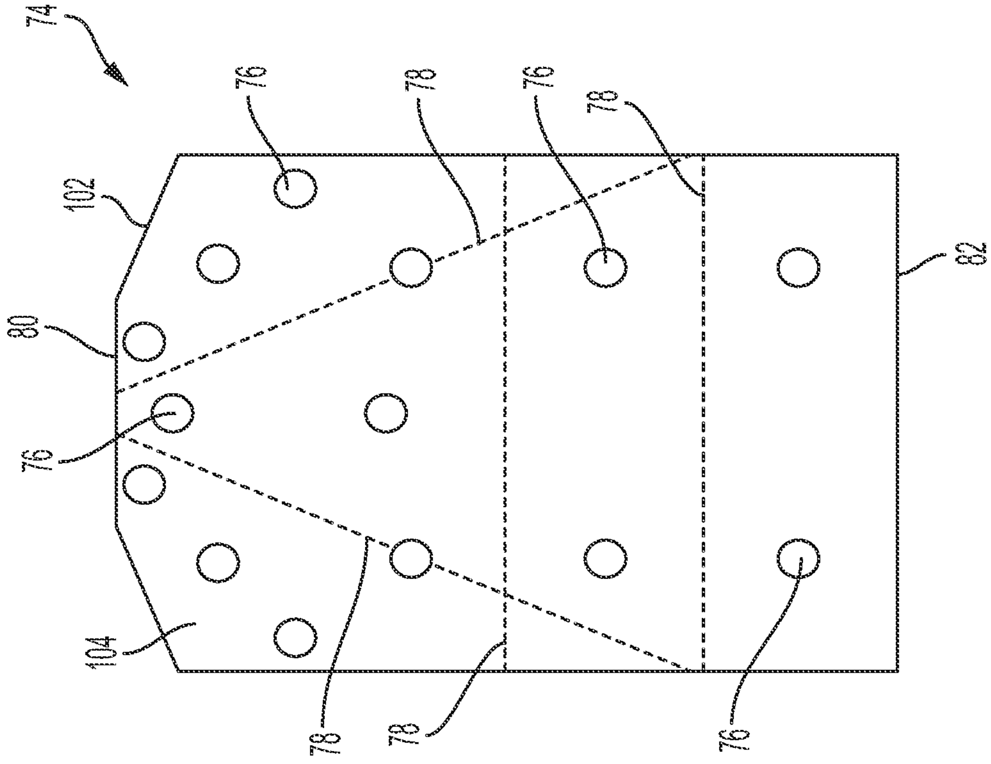
FIG. 9 is an example universal fabric center hinge of the present disclosure.

FIG. 9 illustrates an example of a fabric hinge. FIG. 9 illustrates an example of a universal fabric center hinge (74) of the present disclosure. In one embodiment, the universal fabric center hinge (74) may be provided to attach a laminate panel (46) to a non-laminate panel (45) or between two laminate panels (46).

In one embodiment, the universal fabric center hinge (74) comprises a plurality of through-holes (76). The through-holes (76) may be intended to align with through-holes (similar to through-holes (60)) drilled through the laminate panel (46) thickness such that a mechanical attachment, such as a carriage bolt (56) and nut (58), can be utilized to attach the universal fabric center hinge (74) to the laminate panel (46). The universal fabric center hinge (74) further comprises fold lines (78) located on one or more surfaces of the fabric. The fold lines (78) allow for the manipulation of the universal fabric center hinge (74) to form a resulting fabric center hinge comprising two layers of fabric material.

The fabric material may be selected from suitable fabrics that have a tensile strength per ASTM D751-06 (2011) Section 16, with a 1" strip of at least 150 pound force (lbf)×150 lbf and a tear strength per ASTM D751-06 (2011) Section 32 (trapezoid tear) of more than 45 lbf×45 lbf. Suitable fabrics include laminated fabrics comprising PVC, nylon, vinyl, and similar laminated structures, specifically laminated 4-ply PVC fabrics utilized for tent making.

As shown in FIG. 9, in one embodiment, the universal fabric center hinge (74) comprises a generally rectangular shape with symmetrically placed through-holes (76), the symmetry being around a vertical centerline. The generally rectangular shape comprises a planar sheet of fabric cut to a suitable width for a center hinge (62), but to a height that is larger than suitable for a center hinge (62). The height is selected such that the universal fabric center hinge (74) comprises at least one visual fold line (78) communicating where the universal fabric center hinge (74) is to be folded into an orientation that results in at least 2 layers of the fabric for the center hinge attached to the laminate panel (46).

Figure 10:
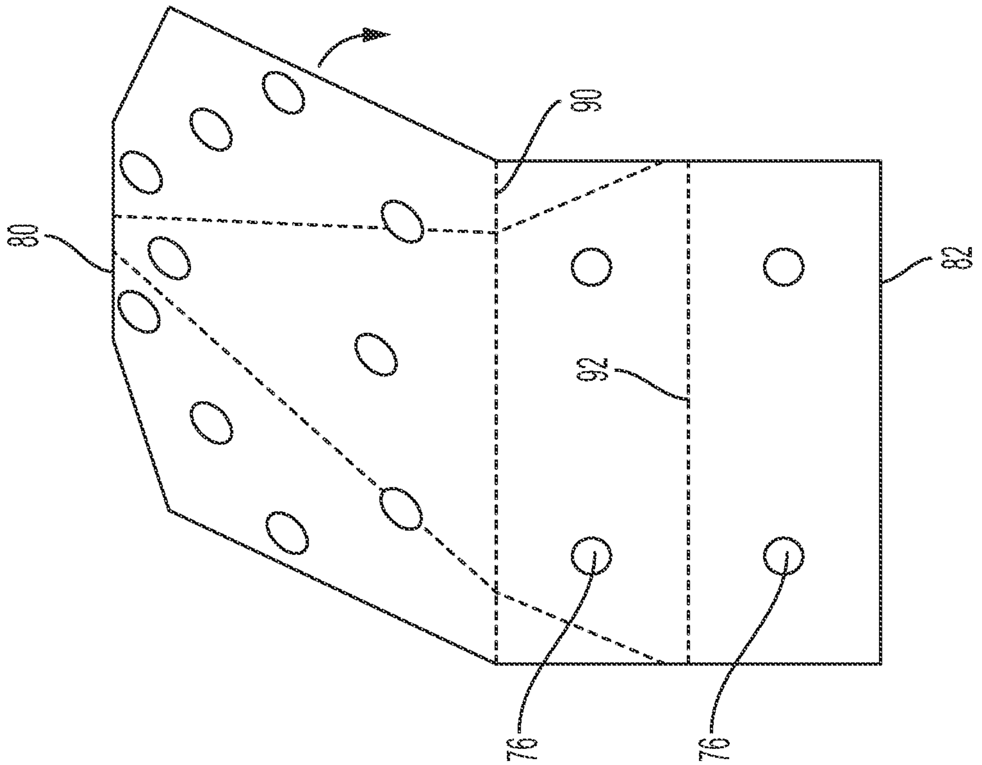
FIG. 10 is an example universal fabric center hinge being folded to an example laminate-to-laminate center hinge orientation of the present disclosure.
Figure 11:
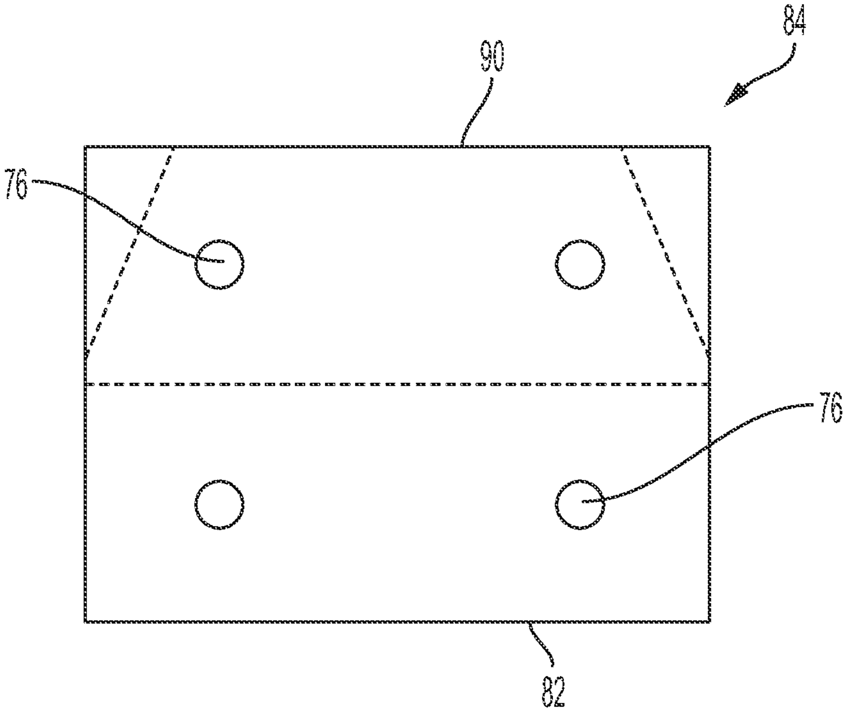
FIG. 11 is a plane view of an example of the laminate-to-laminate center hinge.

As shown in FIG. 10, in one embodiment, there may be two visual parallel fold lines (78): a first visual fold line (90) may be located at a mid-point of the height of the universal fabric center hinge (74), and a second visual fold line (92) may be located at a bottom quarter of the height of the universal fabric center hinge (74). Eight through-holes (76) may be placed symmetrically around the vertical centerline (mid-way point of the width of the universal fabric center hinge (74)) and symmetrically in each quarter of the height of the universal fabric center hinge (74). The top half of the universal fabric center hinge (74) may be folded about the first visual fold line (90) such that a top edge (80) of the universal fabric center hinge (74) is adjacent to a bottom edge (82) of the universal fabric center hinge (74), and the through-holes (76) align to form a laminate-to-laminate center hinge (84), as illustrated in FIG. 11. The second visual fold line (92) is oriented to be adjacent to where the lower edge (38) of a first laminate panel (46) and the upper edge (36) of a second laminate panel (46) align in an overhead sectional door (10).

Figure 12:
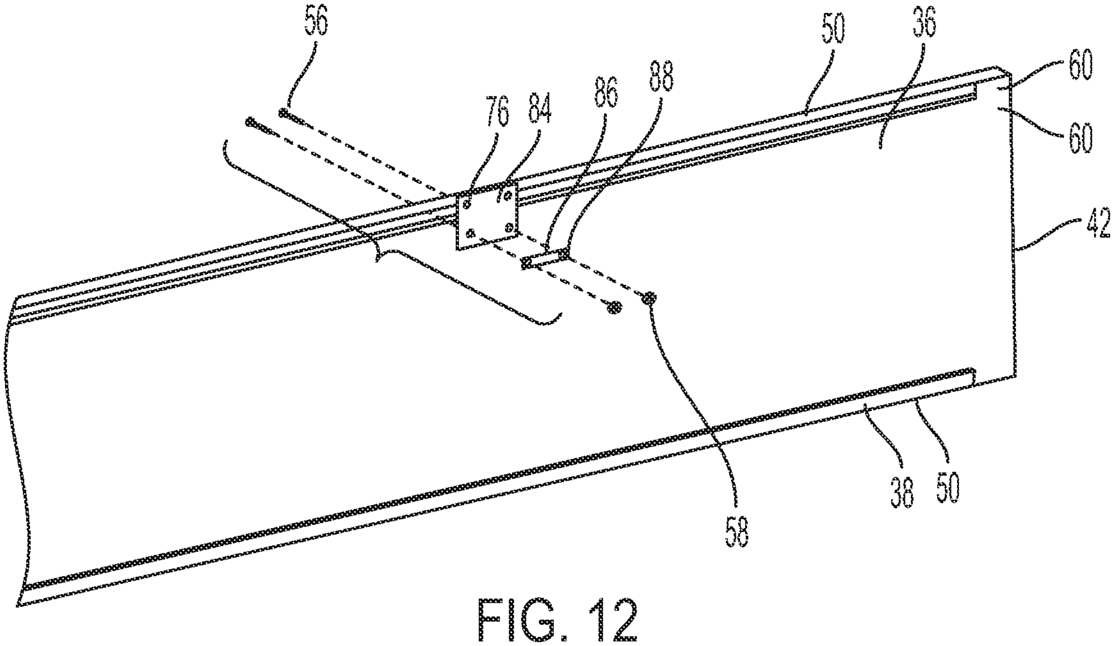
FIG. 12 is a perspective, partial, exploded view of one embodiment of an example laminate panel of the present disclosure.

The laminate-to-laminate center hinge (84) illustrated in FIG. 11 may be utilized to pivotally connect a first laminate panel (46) and a second laminate panel (46). As show in FIG. 12, the laminate-to-laminate center hinge (84) may be mechanically connected to the laminate panel (46). A reinforcing component (86), such as a metal tab with through-holes (88) that orient to the through-holes (76) of the laminate-to-laminate center hinge (84), may be utilized. The reinforcing component (86) may be placed between a first layer of fabric and a second layer of fabric of the laminate-to-laminate center hinge (84). A bolt (56) and a nut (58) combination may be used to couple the laminate-to-laminate center hinge (84) to the first laminate panel (46) and the second laminate panel (46).

Figure 14:
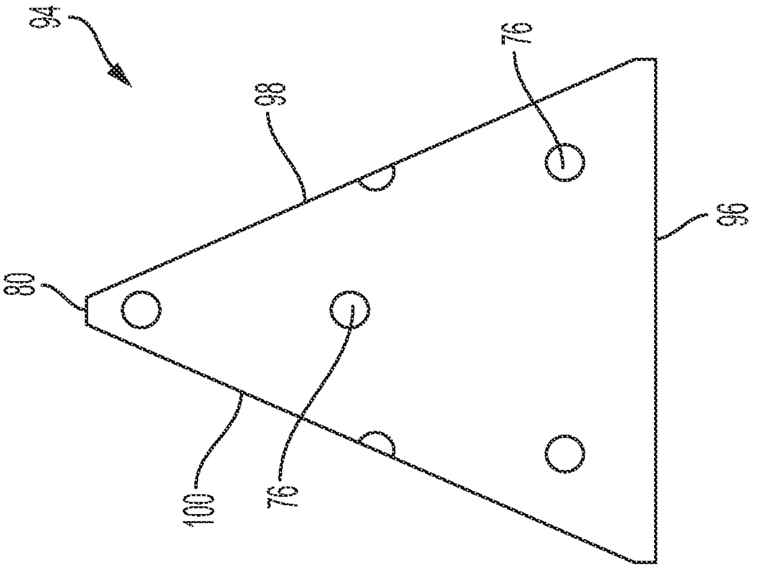
FIG. 14 is an example laminate-to-non-laminate center hinge.
Figure 13:
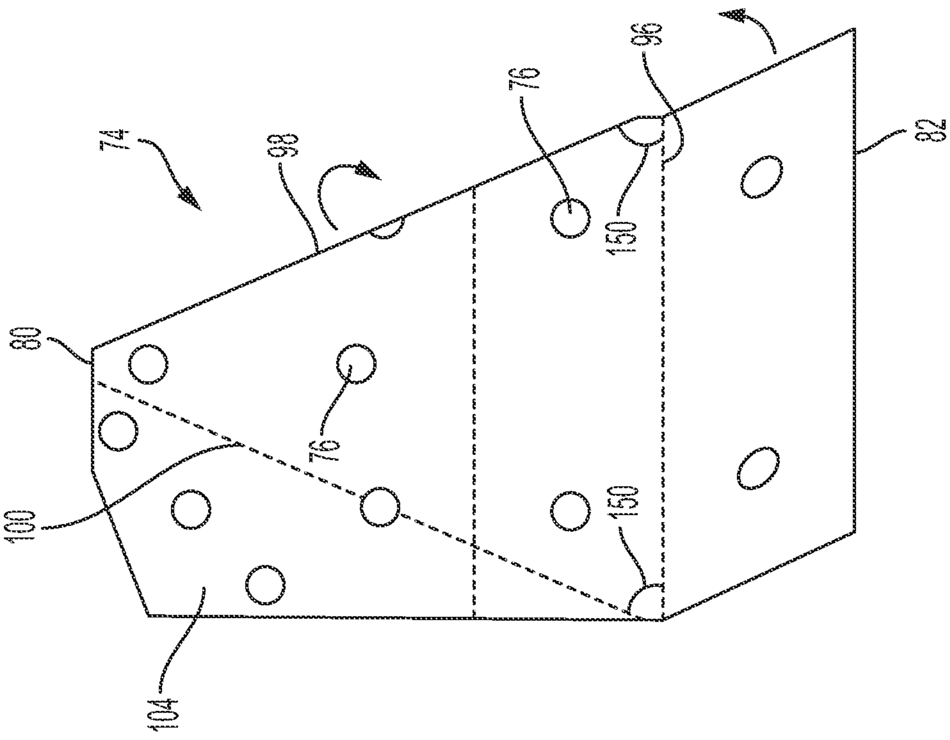
FIG. 13 is an example universal fabric center hinge being folded to a laminate-to-non-laminate center hinge orientation of the present disclosure.

In another embodiment, the universal fabric center hinge (74) may be oriented to form a laminate-to-non-laminate center hinge (94) that may be utilized to pivotally connect a laminate panel (46) and a non-laminate panel (45). As shown in FIGS. 13 and 14, the universal fabric center hinge (74) may comprise three visual parallel fold lines: a first visual fold line (96) (same as the visual fold line (92)) being located at the bottom quarter of the height of the universal fabric center hinge (74), a second visual fold line (98), and a third visual fold line (100) forming about a 70-degree angle (150) to the first visual fold line (96) to form the outline of an isosceles triangle shape within the universal fabric center hinge (74).

Referring back to FIG. 9, visually formed outside of the isosceles triangle shape is a first polygon shape (102) and a second polygon shape (104) in the universal fabric center hinge (74). Referring back to FIG. 13, the first polygon shape (102) that is positioned to the right of the second visual fold line (98) and second polygon shape (104) that is positioned to the left of the third visual fold line (100) are folded along the second visual fold line (98) and third visual fold line (100), respectively, in the same direction. The first polygon shape (102) and the second polygon shape (104) overlap each other on the same side of the laminate-to-non-laminate center hinge (74). The first visual fold line (96) is used to fold the bottom edge (82) of the universal fabric center hinge (74) to the same side as the first and second polygon shapes (102, 104).

Figure 15:
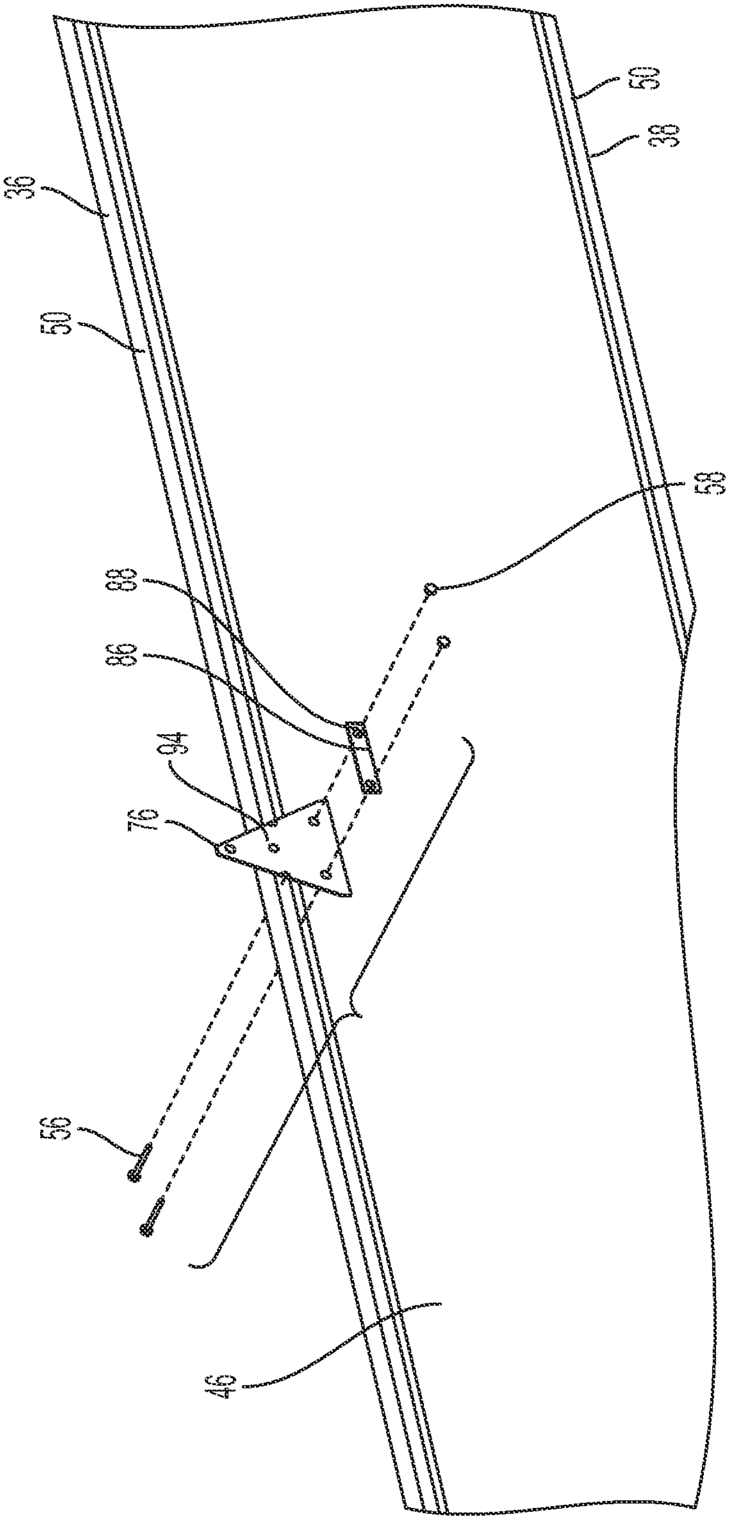
FIG. 15 is an example perspective, partial, exploded view of a second embodiment of a laminate panel of the present disclosure.

Through-holes (76) are located on the universal fabric center hinge (74) such that when folded about the first visual fold line (96), the second visual fold line (98), and the third visual fold line (100), the through-holes (76) align to form a laminate-to-non-laminate center hinge (94), as illustrated in FIG. 14. As shown in FIG. 15, the laminate-to-non-laminate center hinge (94) may be mechanically connected to a laminate panel (46) at the through-holes (76) at the base of the isosceles triangle shape. The laminate-to-non-laminate center hinge (94) is mechanically connected to a non-laminate panel (45) through the through-holes (76) located on the centerline of the width of the laminate-to-laminate fabric center hinge (in the peak of the isosceles triangle shape). A reinforcing component (86), such as a metal tab with through-holes (88) that orient to the through-holes (76) of the laminate-to-non-laminate center hinge (94), may be utilized. The reinforcing component (86) may be placed between the first layer of fabric and the second layer of fabric of the laminate-to-non-laminate center hinge (94). The first visual fold line (90) from the laminate-to-laminate fabric hinge (94) is oriented to be adjacent to where the lower edge (38) of a non-laminate panel (45) and the upper edge (36) of a laminate panel (46) align in an overhead sectional door (10).

Mechanical fastening of the laminate-to-non-laminate center hinge (94) may be accomplished by nails, screws, bolts and nuts and the like. For laminate panels (46), a suitable mechanical fastener is a carriage bolt (56) and nut (58) that passes through a hole (60) through the laminate panel (46) thickness. Non-laminate panel (45) mechanical fasteners may include screws.

Referring back to FIG. 1, in one embodiment, the overhead sectional door (10) may move vertically and horizontally along parallel spaced tracks mounted on the interior of the building. In one embodiment, a roller (28) may be mounted in the roller hinge (30) located near the lateral end (42) of a door panel (14) to connect the track system (16) and door panels (14). In one embodiment, the track vertical section (20) may be inclined slightly away from the opening of the wall (12). To accommodate the slight incline of the track vertical section (20) while maintaining the overhead sectional door (10) in a vertical position, the rollers (28) of successive hinge assemblies may be spaced further away from the attached hinge plates of the roller hinge (30) so that the door panels (14) adopt a vertical position when closing the overhead sectional door (10). It will be noted that the distance of the roller (28) from the hinge base on the uppermost located roller hinge (30) may be greater than the distance for a roller (28) from the hinge base on the lower located roller hinges (30). A pair of spaced, upstanding, aperture ears may extend outwardly (upwardly) from the side edges of one of the hinge plates of the roller hinge (30). A horizontal tube may extend through the apertures of the ears and may be fixed to the ears to provide a stationary bearing for the roller shaft of the roller (28). The roller hinges (30) may be numbered from #1 through to #10 to indicate the distance of the roller (28) from the hinge base (where #1 is the smallest distance, and #10 is the largest distance).

In one embodiment, a bottom most panel (14) may include a bottom bracket (32). The bottom bracket (32) may be a different structure than a roller hinge (30) and may be located at the bottom of the lowest door panel (14) of the overhead sectional door (10). The bottom bracket (32) provides a location for a counterbalance system (24) to be connected to the overhead sectional door (10). Suitable examples include U.S. Pat. Nos. 2,495,672, 2,008,959, 2,436,006, 3,412,780, or 5,404,927.

Figure 19:
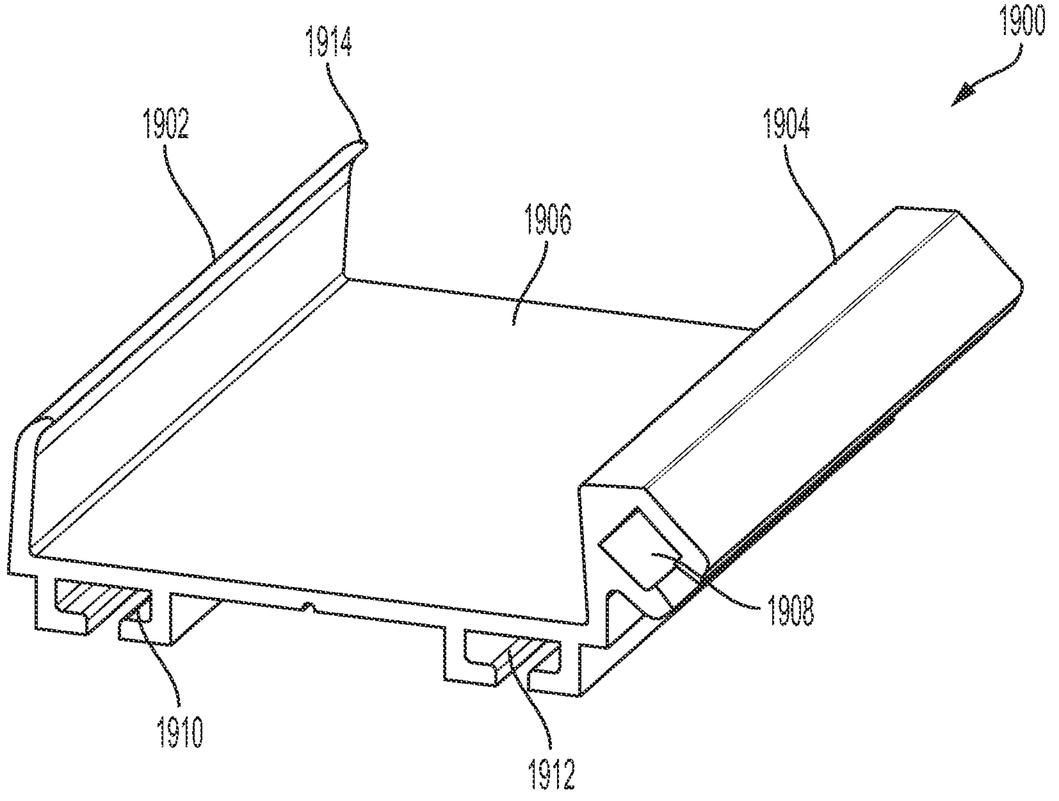
FIG. 19 is an isometric view of an example bottom bracket of the present disclosure.
Figure 20:
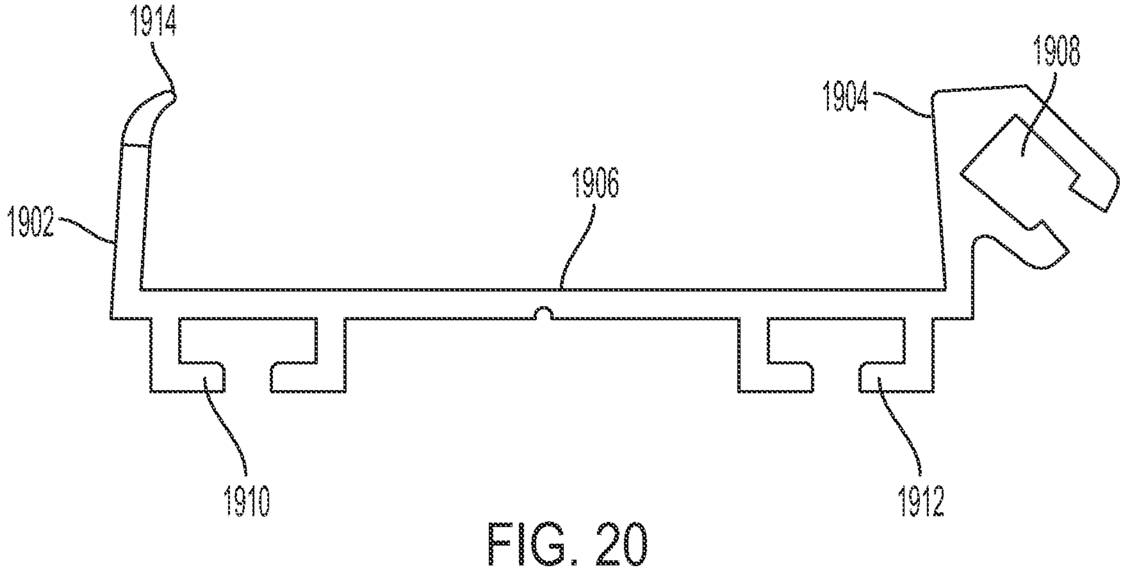
FIG. 20 is a cross-sectional view of the example bottom bracket of the present disclosure.

In one embodiment, the bottom most bracket (32) may not be compatible with the laminate panels (46). In one embodiment, FIGS. 19 and 20 illustrate a bottom bracket (1900) that may be used with the laminate panel (46). FIG. 19 illustrates an isometric view of the bottom bracket (1900). In one embodiment, the bottom bracket (1900) may include a first wall (1902), a second wall (1904), and a bottom surface (1906). The bottom surface (1906) may be coupled to a bottom edge of the first wall (1902) and to a bottom edge of the second wall (1904) on opposite sides of the bottom surface (1906).

In one embodiment, a brush seal bracket (1908) may be formed on the second wall (1904). The second wall (1904) may be on the same side as the inner face (40) of the overhead sectional door (10). The brush seal bracket (1908) may hold a brush seal that may be slid into the brush seal bracket (1908) and held in place by the opposing prongs of the brush seal bracket (1908). The brush seal bracket (1908) may be integrated as part of the second wall (1904). As a result, additional assembly time and parts may be eliminated.

In one embodiment, the bottom bracket (1900) may also include a first astragal bracket (1910) and a second astragal bracket (1912). The first astragal bracket (1910) may be formed on a first bottom side of the bottom surface (1906), and the second astragal bracket (1912) may be formed on a second bottom side of the bottom surface (1906). In other words, the first astragal bracket (1910) and the second astragal bracket (1912) may be formed on opposing sides of the bottom side of the bottom surface (1906).

An astragal seal may be slid into the first astragal bracket (1910) and the second astragal bracket (1912). For example, opposing sides of the astragal seal may be slid into the first astragal bracket (1910) and the second astragal bracket (1912). The astragal seal may form a curve or semi-circle to form a seal between the bottom most laminate panel (46) and a floor of the building that the overhead sectional door (10) is located in.

FIG. 20 illustrates a cross-sectional view of the bottom bracket (1900). FIG. 20 illustrates a curved portion (1914) on the first wall (1902). The curved portion (1914) may provide tolerance for slight variations in a width of the laminate panel (46) that may be fit into the area between the first wall (1902) and the second wall (1904). The laminate panel (46) may be inserted until the lower edge (38) contacts the bottom surface (1906).

In one embodiment, the bottom bracket (1900) may be fabricated from a plastic. The bottom bracket (1900) may be formed by an injection molding process to be formed as a single unitary piece. The bottom bracket (1900) may be adhered to the lower edge (38) of the laminate panel (46). For example, the bottom bracket (1900) may be glued or coupled via an adhesive to the laminate panel (46).

Referring back to FIG. 1, in one embodiment, the counterbalancing system (24) may include a torsion spring. The torsion spring may include a first end operatively connected to a torsion shaft by being threaded onto an inner-spring fitting or cone. The cone may be rigidly affixed to the torsion shaft by a plurality of set screws. The torsion spring may be operatively connected to a winding mechanism at a second end of the torsion spring. The winding mechanism may be fastened to the frame structure adjacent to the opening of the wall (12). A second fixed support may be located at the opposite end of the torsion shaft and may be fastened to the frame structure adjacent to the opening of the wall (12). The torsion shaft is supported for rotation between fixed supports and further includes drums rigidly affixed to the torsion shaft for rotation therewith in a conventional manner. The cables (26) extend from drums and are connected to the bottom bracket (32) of the overhead sectional door (10). The torsion spring distributes the overhead sectional door's (10) weight evenly, which is critical with a wide and/or extremely heavy door.

Figure 21:
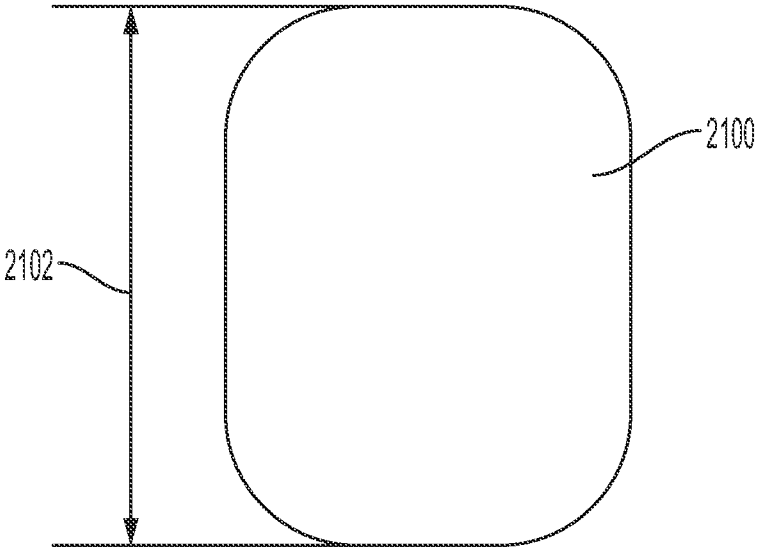
FIG. 21 is a top view of an example reset block of the present disclosure.
Figure 22:
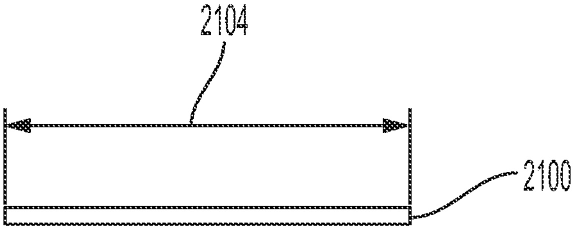
FIG. 22 is a cross-sectional view of an example reset block of the present disclosure.
Figure 23:
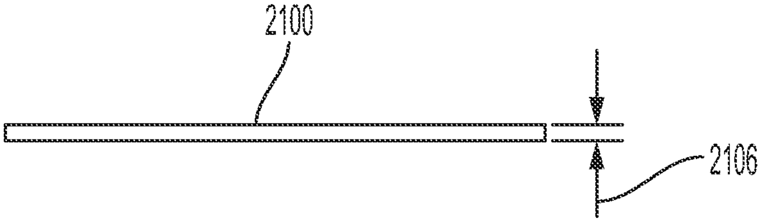
FIG. 23 is a side view of an example reset block of the present disclosure.
Figure 24:
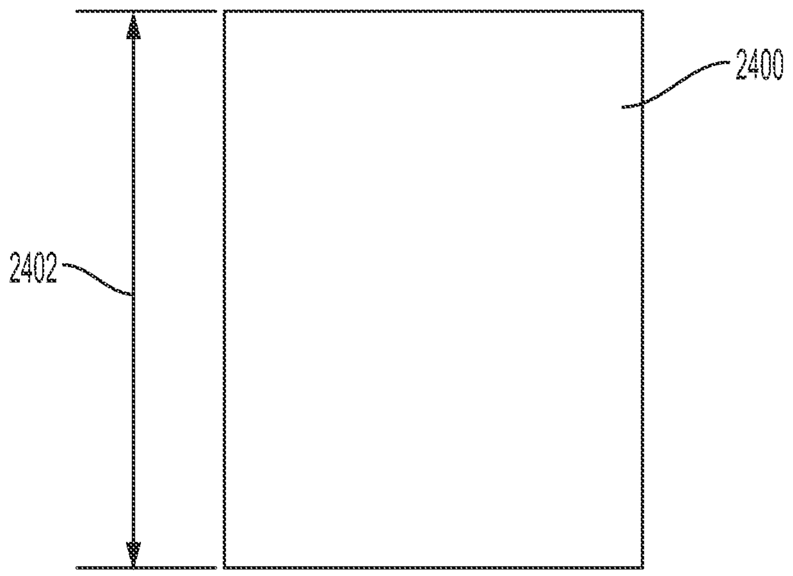
FIG. 24 is a top view of another example reset block of the present disclosure.
Figure 25:
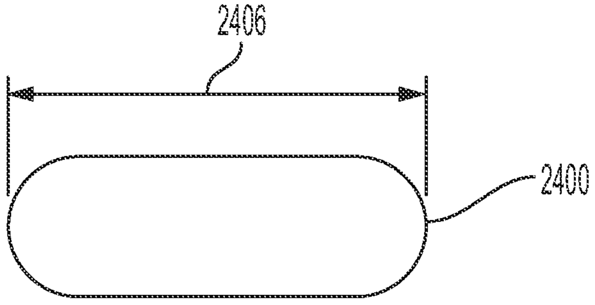
FIG. 25 is a cross-sectional view of another example reset block of the present disclosure.
Figure 26:
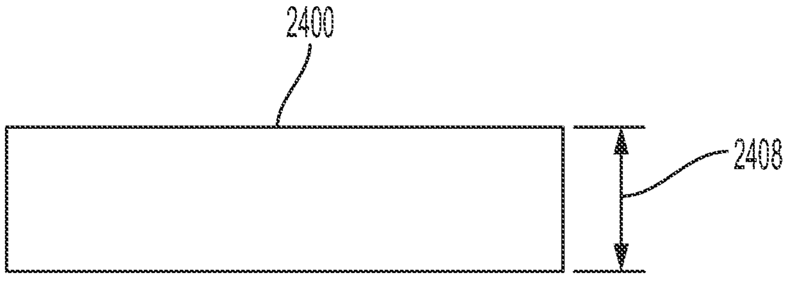
FIG. 26 is a side view of another example reset block of the present disclosure.

In one embodiment, to further insure that each panel (14) is aligned vertically when the overhead sectional door (10) is closed, each panel (14) may include a reset block. FIGS. 21-23 illustrate different views a reset block (2100) that may be inserted between panels (14). FIGS. 24-26 illustrate different views of a reset block (2400) that may be inserted inside of the astragal seal that is inserted into the astragal brackets (1910) and (1912) of the bottom bracket (1900), described above. The reset blocks (2100) and (2400) may be fabricated from a plastic, such as a poly vinyl chloride (PVC) plastic.

In one embodiment, each panel (14) may be coupled with some space between a lower edge (38) and an upper edge (36) of adjacent panels (14). The reset block (2100) may be inserted towards the lateral ends (42) in between adjacent panels (14) to help offload weight of above panels (42) towards the ends and away from a center. This may allow the lower panels (14) to move in and out (e.g., flexing towards the inner face (40) or the outer face (34)) and realign vertically when the overhead sectional door (10) is closed.

FIG. 21 illustrates a top view of the reset block (2100). In one embodiment, the reset block (2100) may have a length (2102) of approximately two inches. FIG. 22 illustrates a side view of the reset block (2100). In one embodiment, the reset block (2100) may have a width (2104) of approximately 1.5 inches. FIG. 23 illustrates a cross-sectional view of the reset block (2100). In one embodiment, the reset block (2100) may have a thickness (2106) of approximately 0.040 inches. Although various example dimensions are provided for the reset block (2100), it should be noted that any dimensions may be deployed for the reset block (2100) based on the dimensions of the panels (14) and/or the weight of each panel (14).

FIG. 24 illustrates a top view of the reset block (2400). In one embodiment, the reset block (2400) may have a length (2402) of approximately two inches. FIG. 25 illustrates a side view of the reset block (2400). In one embodiment, the reset block (2400) may have a width (2404) of approximately 1.5 inches. FIG. 26 illustrates a cross-sectional view of the reset block (2400). In one embodiment, the reset block (2400) may have thickness (2406) of approximately 0.50 inches. Although various example dimensions are provided for the reset block (2400), it should be noted that any dimensions may be deployed for the reset block (2400) based on the dimensions of the panels (14) and/or the weight of each panel (14).

Referring back to FIG. 1 and the counterbalancing system (24), as the torsion rod rotates as the overhead sectional door (10) opens or closes, a drum at each end of the torsion rod rotates. The cable (26) having a first end secured to the drum and a second end secured to the bottom bracket (32) may be wound on the drum when the overhead sectional door (10) opens, helping to lift the overhead sectional door (10), and may unwind from the drum when overhead sectional door (10) closes, controlling the descent of the door (10).

In one embodiment, the counterbalance system (24) may include extension springs located to the mounting brackets of the track system (16) with a cable (26) that is attached to the bottom bracket (32). One end of an extension spring may be secured to a ceiling-mounted bracket. A second end of the extension spring may be secured to a first pulley. The cable (26) may extend around the first pulley, over a stationary pulley, and to the bottom bracket (32).

As noted above, the overhead sectional door (10) may be moved along the track system (16) mounted proximate to the opening of the wall (12). The track system (16) may include the track vertical section (20), the track horizontal section (18), and the curved track transition section (22) joining the track horizontal section (18) and the track vertical section (20) together.

The roller hinge (30) that is connected to the door panels (14) at the lateral ends (42) includes the roller (28) for coupling the overhead sectional door (10) to the track system (16). The track system (16) may have a generally J-shaped cross-sectional configuration into which each of the rollers (28) is captured to assist in the movement and articulation of the overhead sectional door (10) to and between the closed and open configurations as the rollers (28) translate along the track vertical section (20), track transition section (22), and track horizontal section (18) of the track system (16).

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A panel for an overhead sectional door, comprising:
- a laminate core;
- a first laminate skin coupled to a first side of the laminate core;
- a second laminate skin coupled to a second side of the laminate core, wherein the second side is opposite the first side, wherein the first laminate skin and the second laminate skin each comprises a plurality of layers of composite plies; and
- a universal fabric hinge comprising:
  - a plurality of through-holes symmetrically arranged in the universal fabric hinge; and
  - a plurality of visual fold lines, wherein the plurality of visual fold lines are capable of being folded into two different orientations, the plurality of visual fold lines, comprising:
    - a first visual fold line located at a mid-point of a height of the universal fabric hinge;
    - a second visual fold line located at a bottom quarter of the height of the universal fabric hinge;
    - a third visual fold line located at an angle relative to the first fold line; and
    - a fourth visual fold line located at an angle relative to the first visual fold line, wherein the first visual fold line, the third visual fold line, and the fourth visual fold line are arranged to form an isosceles triangle.

2. The panel of claim 1, further comprising:
- a first lateral end;
- a second lateral end opposite the first lateral end;
- a first end stile coupled to the first lateral end of the panel; and
- a second end stile coupled to the second lateral end of the panel.

3. The panel of claim 2, wherein the first end stile and the second end stile each comprises a single piece end stile.

4. The panel of claim 1, further comprising:
- a bottom bracket coupled to a lower edge of the panel.

5. The panel of claim 4, wherein the bottom bracket comprises:
- a first side wall;
- a second side wall;
- a bottom surface coupled to the first side wall and the second side wall;
- a brush seal bracket that is integrally formed as part of the second side wall of the bottom bracket;
- a first astragal bracket coupled to a first bottom side of the bottom surface; and
- a second astragal bracket coupled to a second bottom side of the bottom surface.

6. The panel of claim 1, wherein the laminate core comprises polymeric sheets, foamed sheets, honeycomb structured sheets, thermoset composite sheets, organic coatings, wood, or metal.

7. The panel of claim 1, wherein the plurality of layers of composite plies of the first laminate skin and the second laminate skin each comprises at least one zero degree ply and at least one 90 degree ply.

8. The panel of claim 7, wherein the plurality of layers of composite plies of the first laminate skin and the second laminate skin each comprises two or more layers of 90 degree ply located between two outer layers of zero degree ply.

9. The panel of claim 1, wherein the universal fabric hinge comprises poly vinyl chloride (PVC), nylon, vinyl, or laminated 4-ply PVC fabrics.

10. The panel of claim 1, wherein the universal fabric hinge is folded along the first visual fold line to form a rectangular shaped laminate-to-laminate center hinge, wherein a first set of through-holes of the plurality of through-holes below the first visual fold line is aligned with a second set of through-holes of the plurality of through-holes above the first visual fold line when the universal fabric hinge is folded along the first visual fold line.

11. The panel of claim 1, wherein a bottom edge of the universal fabric hinge is folded along the second visual fold line, a first polygon shape of the universal fabric hinge is folded along the third visual fold line, and a second polygon shape of the universal fabric hinge is folded along the fourth visual fold line to form an isosceles triangle-shaped laminate-to-non- laminate center hinge.

12. The panel of claim 11, wherein the first polygon shape and the second polygon shape are folded in a same direction to overlap each other.

13. The panel of claim 1, wherein each layer of the plurality of layers of the composite plies comprises E-glass fibers or S-glass fibers encapsulated in a thermoplastic matrix material.

14. The panel of claim 13, wherein the E-glass fibers or the S-glass fibers comprise 40 weight percent to 90 weight percent of a total weight of the E-glass fibers or the S-glass fibers encapsulated in the thermoplastic matrix material.

15. The panel of claim 13, wherein a volume percent of the E-glass fibers or the S-glass fibers encapsulated in the thermoplastic matrix material comprises 30 percent to 75 percent of a total volume of each layer of the plurality of layers of the composite plies.

* * * * *